United States Patent [19]

Balzeit et al.

[11] Patent Number: 5,329,301
[45] Date of Patent: Jul. 12, 1994

[54] DEVICE FOR CLAMPING SHEET-SHAPED RECORDING MATERIAL

[75] Inventors: Ralf Balzeit, Preetz; Bernd Lassen, Moenkeberg, both of Fed. Rep. of Germany

[73] Assignee: Linotype-Hell AG, Kiel, Fed. Rep. of Germany

[21] Appl. No.: 852,123

[22] PCT Filed: Nov. 17, 1990

[86] PCT No.: PCT/DE90/00888
§ 371 Date: Apr. 30, 1992
§ 102(e) Date: Apr. 30, 1992

[87] PCT Pub. No.: WO91/07842
PCT Pub. Date: May 30, 1991

[30] Foreign Application Priority Data
Nov. 20, 1989 [DE] Fed. Rep. of Germany ....... 3938480

[51] Int. Cl.$^5$ ............................................. G01D 15/24
[52] U.S. Cl. ..................... 346/134; 355/73; 271/194; 271/276
[58] Field of Search ............. 355/29, 73, 312; 346/24, 134, 138; 271/194, 196, 276, 346/1.1

[56] References Cited

U.S. PATENT DOCUMENTS

| | | | |
|---|---|---|---|
| 3,908,981 | 9/1975 | Naroff | 271/3 |
| 4,268,841 | 5/1981 | Fujii et al. | 346/138 |
| 4,660,825 | 4/1987 | Umezawa et al. | 271/276 |
| 4,660,964 | 4/1987 | Yoshikawa | 355/28 |

FOREIGN PATENT DOCUMENTS

| | | | |
|---|---|---|---|
| 2209515 | 2/1975 | Fed. Rep. of Germany | G03B 27/52 |
| 2754370 | 6/1979 | Fed. Rep. of Germany | 271/196 |
| 3230676A1 | 3/1983 | Fed. Rep. of Germany | H04N 1/08 |
| 10968 | 1/1985 | Japan . | |

OTHER PUBLICATIONS

Patent Abstracts of Japan, E-83, Nov. 20, 1981, vol. 5, No. 181, Umezawa, "Sheet Retaining Device".
Patent Abstracts of Japan, E-268 Sep. 22, 1984, vol. 8, No. 209, Houjiyou, "Sheet Holder".

Primary Examiner—Benjamin R. Fuller
Assistant Examiner—J. E. Barlow, Jr.
Attorney, Agent, or Firm—Hill, Steadman & Simpson

[57] ABSTRACT

The invention is directed to a device for clamping sheet-shaped film material onto the recording drum of a reproduction device and is directed to the operation of this device. The recording drum comprises axially proceeding suction-hole rows for the vacuum-fixing of the recording material. Suction channels, each of which connects the suction holes of a suction hole row to one another, proceed in the wall of the recording drum. A vacuum distributor controllable by the rotational movement of the recording drum is arranged in the recording drum, this controllable vacuum distributor selectively bringing the individual suction channels, the corresponding suction hole rows into communication with a stationary vacuum pump. The vacuum distributor is controllable such that that suction hole row on which the starting region of the recording material lies is first charged with vacuum during the clamping event. As a result thereof, a high initial vacuum is achieved, as a result whereof the recording material does not slip. Further suction hole rows are then successively cut-in in accordance with the increasing wrap of the rotating recording drum by the recording material and are charged with vacuum. The cut-in of further suction hole rows is ended in accordance with the respective circumferential length of the recording material at that suction hole row on which the end region of the recording material lies. In particular, large-format recording material can be clamped onto the recording drum without creating folds and warping, and can be reliably fixed thereat with the device.

22 Claims, 6 Drawing Sheets

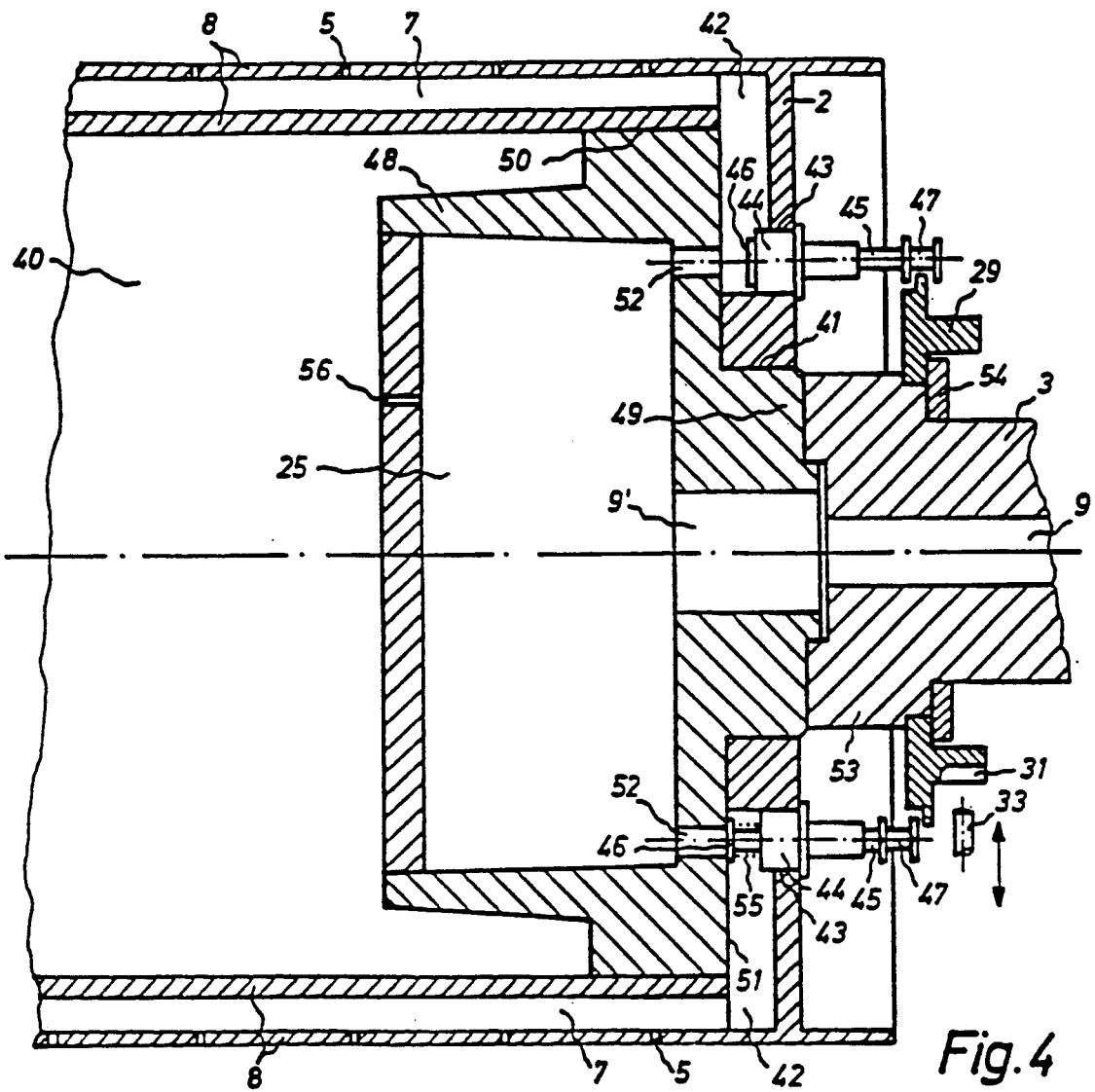
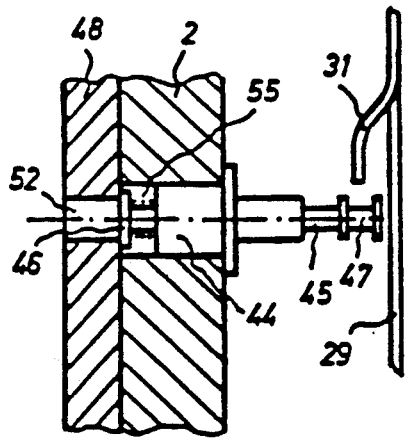
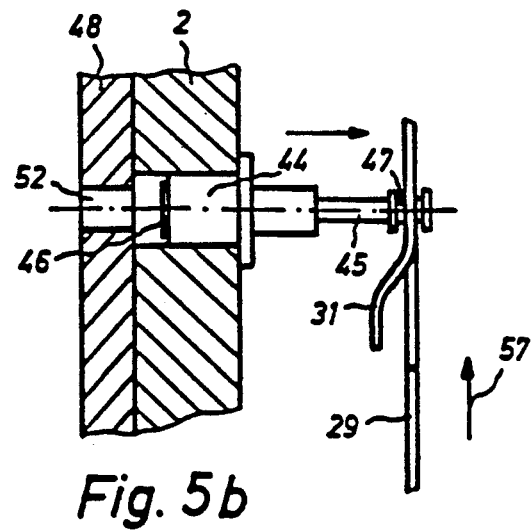
Fig. 4
Fig. 5a
Fig. 5b

DEVICE FOR CLAMPING SHEET-SHAPED RECORDING MATERIAL

BACKGROUND OF THE INVENTION

The invention refers to the field of electronic reproduction technology and is directed to a device for clamping sheet-shaped recording material onto a recording drum with vacuum suctioning in an electronic reproduction device, and is also directed to a method for clamping. For example, the electronic reproduction device is a color scanner or a color recorder for producing color separations for multi-color printing.

In such an electronic reproduction device, sheet-shaped film material, also referred to as film proofs, are clamped onto the recording drum and fixed thereat by vacuum suctioning. The clamped film proofs are exposed point-by-point and line-by-line by a recording element, are then in turn unclamped from the recording drum and developed. The developed film proofs are the color separations for the multi-color print.

The film proofs can already be present in the form of sheet film material that is taken from a sheet film cassette for clamping or that is cut off before clamping from roll film material situated in a roll film cassette.

It is necessary for an effective employment of an electronic reproduction device, in particular, to shorten the preparation and setting times in comparison to the times required for the actual film exposure. This can occur, among other things, in that optimally many work steps normally to be executed by the operator such as, for example, the clamping and unclamping of the film proofs onto or, respectively, from the recording drum are automated.

Added thereto is the desire to be able to expose film proofs of different formats, particularly large-format film proofs, for example for reproducing posters.

DE-B-22 09 515 already discloses an electronic reproduction device having a device for clamping sheet-shaped recording material onto a recording drum with vacuum suctioning.

The recording drum is a hollow cylinder that is closed by covers. Shaft extensions with which the recording drum is rotatably seated at the device carrier of the reproduction device are secured to the covers. The walls of the hollow cylinder are provided with suction holes for suctioning the film proofs against the drum surface. The suction holes are in communication with the interior of the drum. One shaft extension is hollow, a suction channel thus arising that connects the interior of the drum to a stationary vacuum pump via a rotary transmission leadthrough secured to the shaft extension and via a stationary suction line.

The film proofs to be exposed, which are situated in a sheet film cassette, have their registration perforations hooked over registration pins situated on the recording drum on the basis of a manually actuatable roller and lever mechanism in the known reproduction device. The vacuum pump is then activated and the recording drum is turned, as a result whereof the film proofs are pulled from the sheet film cassette, are wound around the rotating recording drum and are fixed on the drum surface by the vacuum. After the exposure, the film proofs are unclamped and conveyed back into the roll film cassette by the roller and lever mechanism.

The apparatus disclosed by DE-B-22 09 515 has the disadvantage that only film proofs of given formats and provided with registration perforations can be clamped and that the clamping and unclamping can only ensue with the collaboration of an operator.

U.S. Pat. No. 4,268,841 discloses an electronic reproduction device that already comprises a means for the automatic clamping of sheet-shaped recording material onto a recording drum, for vacuum suctioning of the recording material against the recording drum and for the automatic unclamping of the exposed recording material from the recording drum. The sheet-shaped recording material is automatically conveyed from a supply station to the recording drum via a conveyor means, is wound around the recording drum with the assistance of an annular channel between drum surface and housing wall and is fixed thereon by vacuum suctioning. After the exposure, the recording material is likewise automatically unclamped from the recording drum and supplied to an exit opening in the device for further-processing. The generated surface of the recording drum is provided with suction holes arranged in rotational direction that are connected to a stationary vacuum pump via the interior of the recording drum and via a suction line in the shaft. A vacuum control means with which the vacuum for the suction holes can be switched on and off or set to an intermediate value is situated in the suction line.

The apparatus disclosed by U.S. Pat. No. 4,268,841 has the disadvantage that only sheet-shaped recording material can be clamped on and unclamped and that no specific measures for the reliable, fold-free clamping of recording material in different formats are recited that guarantee a smooth, automatic execution.

The devices disclosed by DE-B-22 09 515 and by U.S. Pat. No. 4268,841 have the further disadvantage that all suction holes of the recording drum are simultaneously charged with vacuum when the vacuum pump is switched on at the beginning of the clamping process. Particularly given small-format film proofs, high vacuum losses thereby arise since only a small number of suction holes are covered by the film proof.

As a result of the high vacuum losses, a reliable clamping of the film proofs is then not guaranteed during the exposure time wherein the recording drum rotates at high speed. The suction and, thus, the fixing of the film proofs can in fact be improved by installing a vacuum pump having a high nominal power; this, however, would be involved.

It is already known for reducing the vacuum losses to respectively seal the suction holes not covered by the momentarily clamped film proof by adhesive strips or to employ a recording drum wherein the non-covered suction holes are automatically closed with valves. Sealing the suction holes with adhesive strips is time-consuming and is involved and unreliable with automatically operating valves.

It is likewise already known to subdivide the recording drum by partitions into individual, connectable vacuum chambers. In this case, a reduction of the vacuum losses can be achieved in that respectively only those vacuum chambers are activated that, based on the axial format length, momentarily participate in the fixing of the film proofs.

DE-A-32 30 676 already discloses a vacuum clamping means that employs a combination of pneumatic and mechanical components for fixing sheet-shaped recording material on a recording drum. The suction holes of the recording drum are combined in at least two groups, each of which comprises one or more rows of suction holes connected to one another. The individual suction hole groups are in communication with one another by throttle lines. At least one group is connected to a stationary vacuum generator.

What is achieved by adding individual suction hole groups or suction hole rows is that recording material having different formats can be clamped without high vacuum losses. Means for the automatic control of the valves and for conveying the recording material to or from the recording drum are not specified.

The apparatus disclosed by DE-A-32 30 676 thus has the disadvantage that the feed of the sheet-shaped recording material must ensue manually and that the switching of the suction hole groups during the clamping or unclamping event does not ensue automatically dependent on the rotational motion of the recording drum or, respectively, on the respective wrap of the recording material around the recording drum and, thus, dependent on the respective format of the recording material to be clamped on.

The tendency in reproduction technology is to employ unperforated roll film material and to cut the respectively required film lengths from the roll film material and clamp them on. Added thereto is the desire to be able to clamp and release arbitrary formats. Practice has shown that it is difficult to clamp, in particular, large-format film proofs onto the recording drum exactly and fold-free. An exact and smooth clamping of the film proofs, however, is an indispensable prerequisite for the exposure of exactly registered color separations and for the production of qualitatively high-grade multi-color prints.

SUMMARY OF THE INVENTION

It is therefore an object of the invention to specify an apparatus and a method for clamping sheet-shaped recording material onto a recording drum with vacuum suctioning which enable the clamping of, in particular, large-format recording material and the reliable fixing of recording material having different formats on the recording drum given an economical vacuum production, so that a smooth work sequence is always guaranteed.

With reference to the device, this object is achieved by providing a device for clamping sheet-shaped recording material onto a recording drum of a reproduction device wherein suction holes are provided in a generated surface of the recording drum, these being arranged in suction hole rows proceeding essentially axially vis-a-vis the drum axis. Suction channels proceed essentially axially vis-a-vis an axis of the drum in the recording drum. Each suction channel connects the suction holes of a suction hole row to one another. A vacuum chamber is provided in the recording drum which is in communication with a stationary vacuum pump. Distributor lines are provided between the vacuum chamber and the individual suction channels. Controllable valves are provided in the distributor lines for selective connection and separation of the individual channels to and from the vacuum chamber. A control means is arranged in a region of the recording drum and is controlled by a rotational motion of the recording drum for achieving an automatic, successive opening and/or closing of said controllable valves during clamping and/or unclamping of the recording material. The controllable valves are automatically controlled during clamping by the control means such that, first, the suction hole row lying in the starting region of the recording material is connected to the vacuum chamber and charged with vacuum, and thereafter with increasing wrap of the recording material around the recording drum, further suction hole rows are then successively connected to the vacuum chamber and charged with vacuum. In accordance with a respective circumferential length of the recording material, the cut-in of further suction hole rows is interrupted after the suction hole row lying in an end region of the recording material.

The invention shall be set forth in greater detail below with reference to FIGS. 1 through 6.

BRIEF DESCRIPTION OF THE DRAWINGS

FIG. 4 is an exemplary embodiment of a clamping device;

FIG. 5 shows the control of the valves; and

DESCRIPTION OF THE PREFERRED EMBODIMENTS

Figure 1:
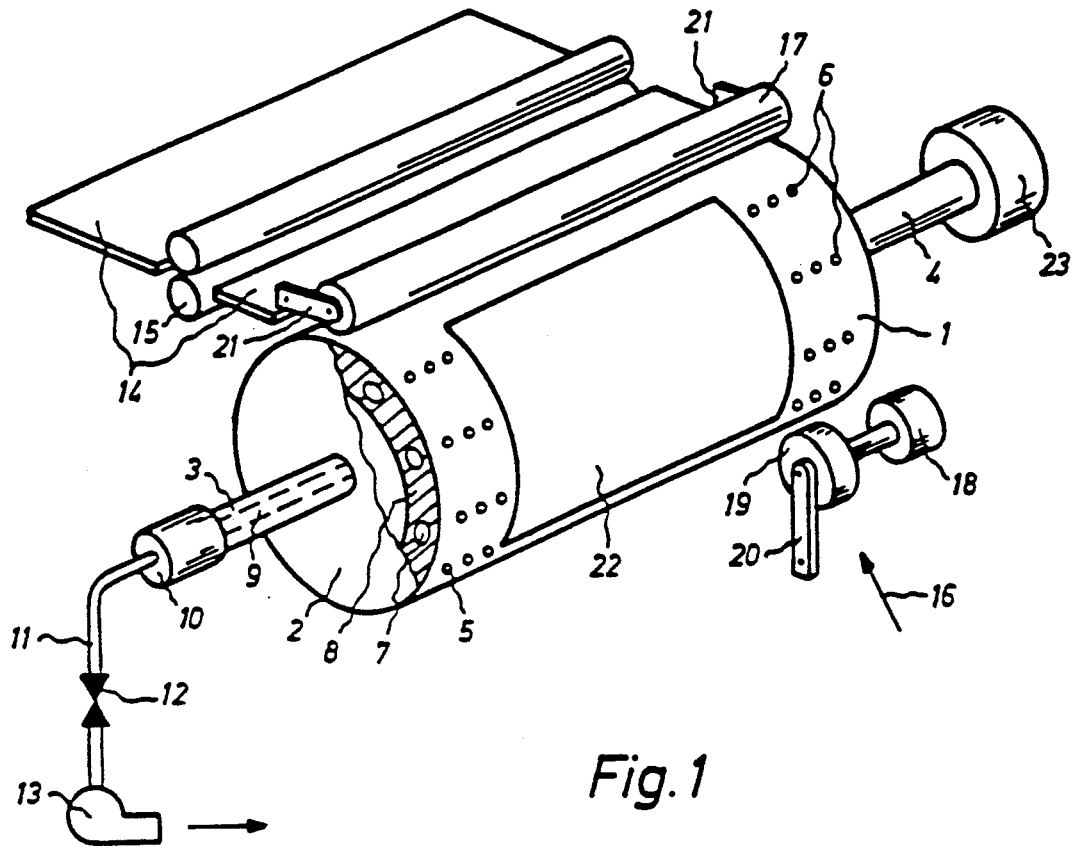
FIG. 1 is a perspective view of a clamping device comprising to recording drum for an electronic reproduction device.

FIG. 1 shows a clamping device with a recording drum of an electronic reproduction device (not shown in greater detail) in a perspective view.

The recording drum 1 is a hollow cylinder that is closed by covers 2. Shaft extensions 3 and 4 that are rotatably seated at the device carrier of the reproduction device are attached to the covers 2. The drum surface is provided with suction holes 5 that are arranged in rows proceeding axially vis-a-vis the drum axis. The circumferential spacings of the suction hole rows 6 are expediently adapted to the standard formats of film proofs to be exposed, i.e. the spacings of the suction hole rows 6 from one another are selected such that the starting and ending regions of the clamped film proofs respectively lie under a suction hole row 6. The suction holes of the individual suction hole rows 6 discharge in suction channels 7 that proceed in the wall 8 of the hollow cylinder axially vis-a-vis the drum axis. Only some of these suction channels 7 can be seen in section in the figure. The shaft extension 3 comprises an axial suction bore 9. A vacuum rotary transmission leadthrough 10 that connects the suction bore 9 in the rotating shaft extension 3 to a stationary vacuum line 11 is situated in the shaft extension 3. The vacuum line is connected to an activatable and deactivatable vacuum pump 13 via a controllable secondary air valve 12.

The film proofs to be exposed can be manually or automatically conveyed to the recording drum 1 and clamped. In the illustrated exemplary embodiment, an automatic feed and clamping of the film proofs to be exposed is shown. For that purpose, a film conveying surface 14 is present that conveys the film proofs to the drum surface with a pair of conveyor rollers 15. The film proofs can be taken from a sheet film cassette or, on the other hand, can be cut off from a roll film material in accordance with the required format length, this roll film material being situated in a roll film cassette.

The clamping device also comprises a positioning drive 16 and a pressure roller 17. The positioning drive 16 is composed of a friction wheel 19 driven by a motor 18, this friction wheel 19 being capable of being pivoted against the recording drum 1 with a lever 20. The positioning drive 16 serves the purpose of turning the recording drum 1 into various positions during the clamping and unclamping of the film proofs. The pressure roller 17 can likewise be pivoted against the recording drum 1 with a lever 21 and is arranged in that region whereat the beginnings of the film proofs conveyed to the recording drum 1 touch the drum surface. The figure shows a film proof 22 that is already clamped on the recording drum 1 and fixed by vacuum. During the exposure of the film proof 22, the recording drum 1 is driven by a main motor 23 coupled to the shaft extension 4, whereby the positioning drive 16 and the pressure roller 17 are pivoted away from the drum surface, as shown.

The recording drum 1 comprises a controllable vacuum distributor (not shown in the figure) that, when clamping the film proofs 22, successively charges the individual suction hole rows 6 with vacuum dependent on the respective rotational angle of the recording drum 1 or, respectively, on the momentary wrap of the film proofs 22 around the recording drum 1 and that respectively only connects as many suction hole rows 6 as devolve onto the circumferential length of the momentarily clamped film proofs 22.

As a result of the step-by-step cut-in of the suction hole rows 6 in accordance with the respective wrap of the film proofs 22, an exact and fold-free clamping of, in particular, large-format film proofs and, due to the low vacuum losses, a reliable fixing of the film proofs on the drum surface during the exposure are advantageously achieved.

The structure of the clamping device and of the recording drum as well as the operation of the clamping device shall be set forth in greater detail below.

Figure 2:
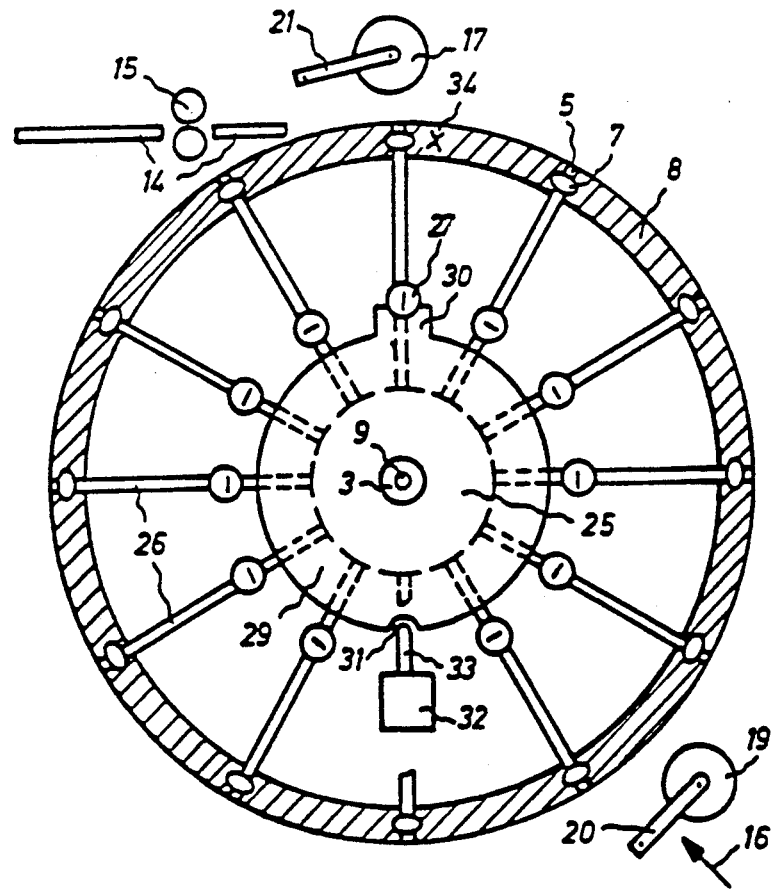
FIG. 2 show the fundamental structure of a recording drum comprising a vacuum distributor.

FIG. 2 shows the fundamental structure of the recording drum and vacuum distributor in a section through the recording drum 1.

The axially proceeding suction channels 6 into which the suction holes 5 of the individual suction hole rows 6 discharge are visible in the wall 8 of the recording drum 1. The suction bore 9 that is in communication with the vacuum pump 13 (not shown) may be seen in the shaft extension 3. The suction bore 9 discharges into a cylindrical vacuum chamber 25 in the interior of the drum. The vacuum chamber 25 is connected to the individual suction channels 7 or, respectively, suction hole rows 6 via distributor lines 26 proceeding radially vis-a-vis the drum axis wherein controllable valves 27 are situated. The valves 27 that are circularly arranged around the drum axis can selectively connect the individual suction channels 7 to the vacuum chamber 25 or disconnect them from it.

In the illustrated exemplary embodiment, the valves 27 are mechanically controllable by a plate cam. Alternatively thereto, pneumatic or electrically controllable valves, for example, can also be employed.

The plate cam 39 that comprises a control finger 30 and a channel 31 at its circumference is seated on the shaft extension 3 with a glide fit. A lock pin 33 that blocks the plate cam 29 in a specific position can be introduced into the channel 31 of the plate cam 29 with a stationary control element 32. By turning the recording drum 1, the valves 27 then move past the control finger 30 of the blocked plate cam 29, the latter successively opening or closing the valves 27 dependent on the rotational sense of the recording drum 1, whereby the valves 27 remain in the work position respectively assumed.

The respective work position of the valves 27 is indicated by strokes 28, whereby a stroke 28 proceeding in the direction of a distributor line 26 indicates an opened valve 27, and a stroke 28 proceeding perpendicularly to a distributor line 26, denotes a closed valve 27.

The glide fit with which the plate cam 29 is seated on the shaft extension 3 is of such a nature that the shaft extension 3 rotates without noteworthy friction, on the one hand, when the plate cam 29 is blocked and, on the other hand, entrains the plate cam 29 without slippage in the position relative to the recording drum 1 assumed upon release by the lock pin 33, whereby no further valves 27 are actuated given continuation of the drum rotation.

The operation of the clamping device and of the vacuum distributor shall be set forth in greater detail with reference to FIGS. 3a through 3f.

Figure 3A:
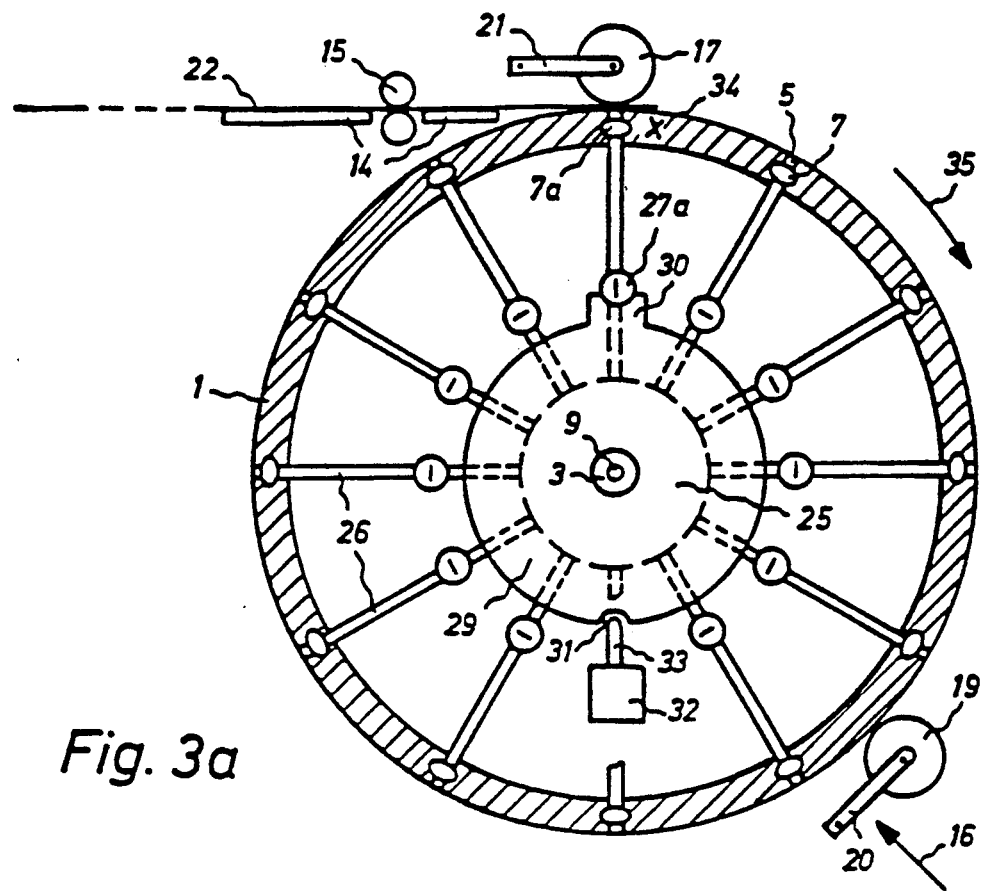
FIG. 3 illustrates the clamping device during the individual clamping phases.

FIG. 3a shows the beginning of the clamping process for a film proof 22, whereby the recording drum 1 shown in section is in a start of clamping position.

At its circumference, the recording drum 1 comprises a clamping mark 34 that marks the generated line of the recording drum 1 on which the start of the film proof 22 to be clamped on should respectively lie. This clamping mark 34 is expediently situated in the proximity of a suction channel 7 or, respectively, of a suction hole row 6, so that the respective starting region of a film proof 22 lies over this suction hole row and is suctioned on.

In the start of clamping position of the recording drum 1, the clamping mark 34 lies in the region of the pressure roller 17 in which the start of the film proof 22 conveyed to the recording drum 1 comes into contact with the drum surface.

The recording drum 1 is turned into the start of clamping position by the positioning drive 16 pivoted against the drum surface, the recording drum 1 initially remaining in this start of clamping position by shutting off the positioning drive 16.

The plate cam 29 is blocked by the lock pin 33 in the position for the start of clamping position of the recording drum 1 in which the control finger 30 opens the valve 27a, as a result whereof only that suction channel 7a lying in the region of the clamping mark 34 is charged with the vacuum when the vacuum pump 13 is turned on.

The film proof 22 of a given format length that is to be clamped on is conveyed to the recording drum 1 over the film conveying surface 14 with the pair of conveying rollers 15 until the start of the film proof 22 lies at the clamping mark 34. The starting region of the film proof 22 is then pressed against the suction hole row belonging to the suction channel 7a by lowering the pressure roller 17 and is fixed on the drum surface by the vacuum building up in the suction hole row after the vacuum pump 13 is switched on.

Since only the suction hole row belonging to the suction channel 7a is charged with vacuum at this time, the vacuum takes effect thereat with its full nominal value, as a result whereof a slippage of the starting region of the film proof 22 from its exact position is advantageously avoided in the starting phase of the film clamping.

After the starting region of the film proof 22 has been fixed on the first suction hole row, the positioning drive 16 is again switched on and the recording drum 1 is turned from the start of clamping position in the direction of an arrow 35, as a result whereof the film proof 22 is pulled from the film conveying surface 14 and is placed around the rotating recording drum 1 with increasing wrap.

Figure 3B:
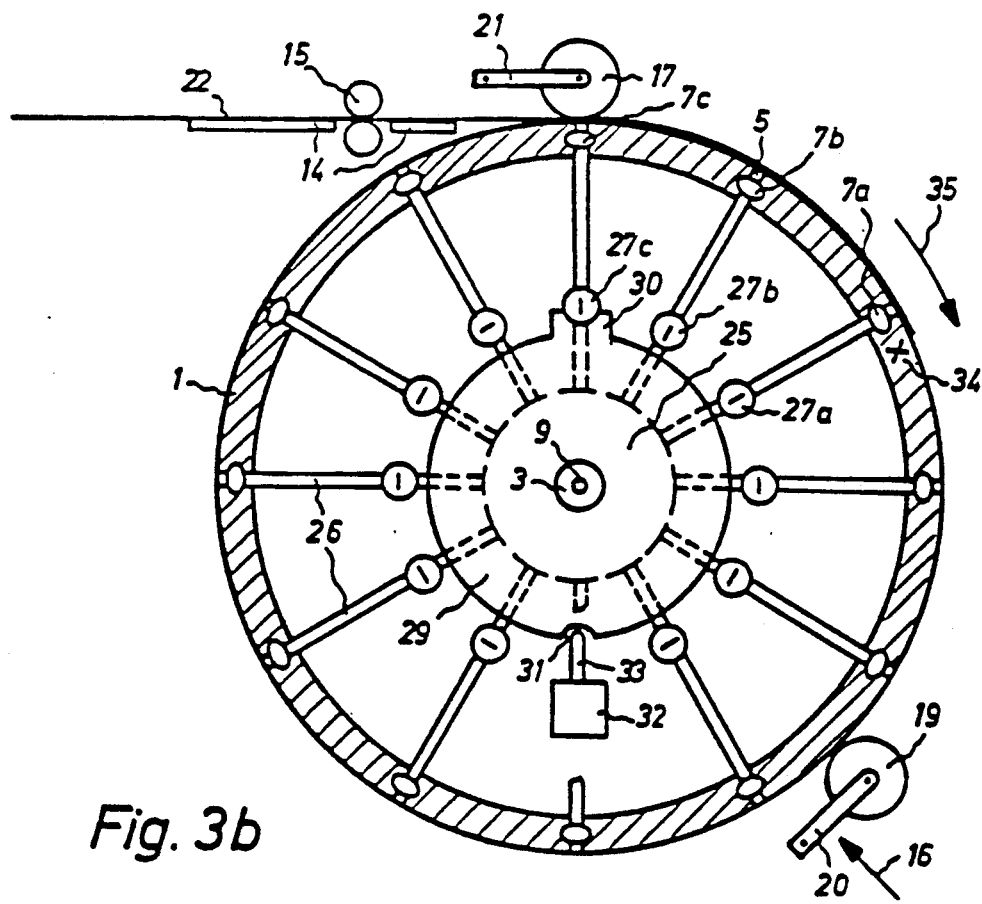

FIG. 3b shows an advanced stage of the clamping process wherein the valves 27b and 27c have been moved past the control finger 30 of the blocked plate cam 29 and, thus, have been opened successively by turning the recording drum 1 in the direction of the arrow 35, so that suction hole rows additionally belonging to the suction channels 7b and 7c are now charged with vacuum in accord with the momentary wrap of the film proof 22 around the recording drum 1.

Figure 3C:
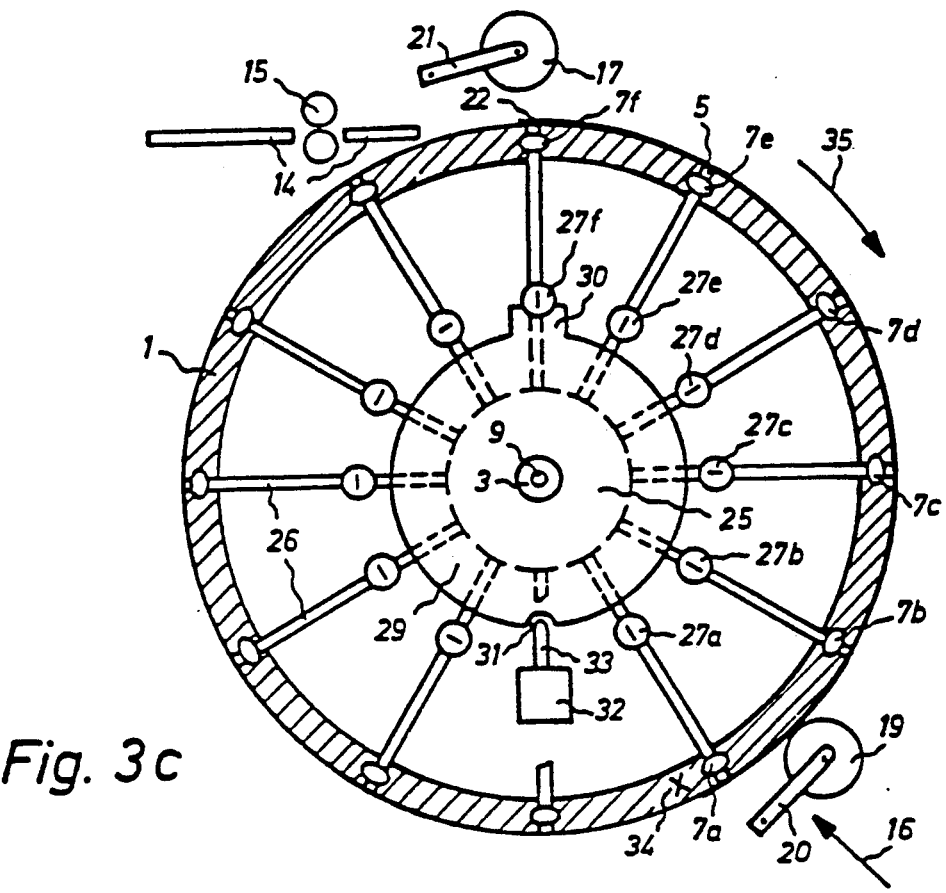

FIG. 3c shows the clamping process at the time at which the film proof 22 has already been entirely clamped by turning the recording drum I in the direction of the arrow 35 and by step-by-step cut-in of the suction hole rows belonging to the suction channels 7a through 7f.

The clamping behavior is significantly improved by the step-by-step cut-in of the suction rows 7. Since the full volume of the vacuum is effective only at the respectively connected suction hole row at which film proof and drum surface contact at the moment, and since the free end of the film proof 22 has not yet been suctioned on, it can center freely during clamping, as a result whereof an exact and fold-free clamping of, in particular, long film proofs is advantageously guaranteed. The clamping behavior can be further improved in that the nominal value of the vacuum is lowered during the clamping event by engaging the secondary air valve 12.

After the film proof 22 has been completely clamped, the pressure roller 17 is lifted off from the drum surface and the lock pin 33 is withdrawn from the channel 31 of the plate cam 29 by the control element 32, as a result whereof the blocking of the plate cam 29 is cancelled. When the recording drum 1 continues to turn, the plate cam 29 now turns along with the recording drum 1, namely in the position relative to the recording drum 1 assumed upon release of the plate cam 29. As a result thereof, a relative motion between the valves 27 and the control finger 30 of the plate cam 29 no longer occurs; no further valves 27 are opened and no further suction hole rows are cut-in.

Only that number of suction hole rows as in fact are circumferentially covered by the momentarily clamped film proof are thus respectively charged with vacuum, whereby the remaining suction hole rows are disconnected. As a result of the low vacuum losses, a reliable fixing of the film proofs having different formats is thereby always guaranteed on the recording drum, particularly in the exposure phase wherein the recording drum rotates with high speed.

The switch signal for the stationary control element 32 with which the blocking of the plate cam 29 is cancelled given complete clamping of the film proofs having different formats can be automatically generated.

In this case, for example, a clock generator is coupled to the recording drum 1, this generating a clock sequence upon rotation of the recording drum 1. The clocks counted beginning from the start-of-clamping position of the recording drum 1 are a measure for the momentary rotational angle of the recording drum 1 and, thus, for the momentarily clamped length of the film proof 22. The respective format length of the film proof 22 to be clamped on is prescribed as a plurality of clocks. The counted clocks of the clock generator are then continuously compared to the prescribed plurality of clocks and the switch signal for the control element 32 is generated given equality of clocks.

Figure 3D:
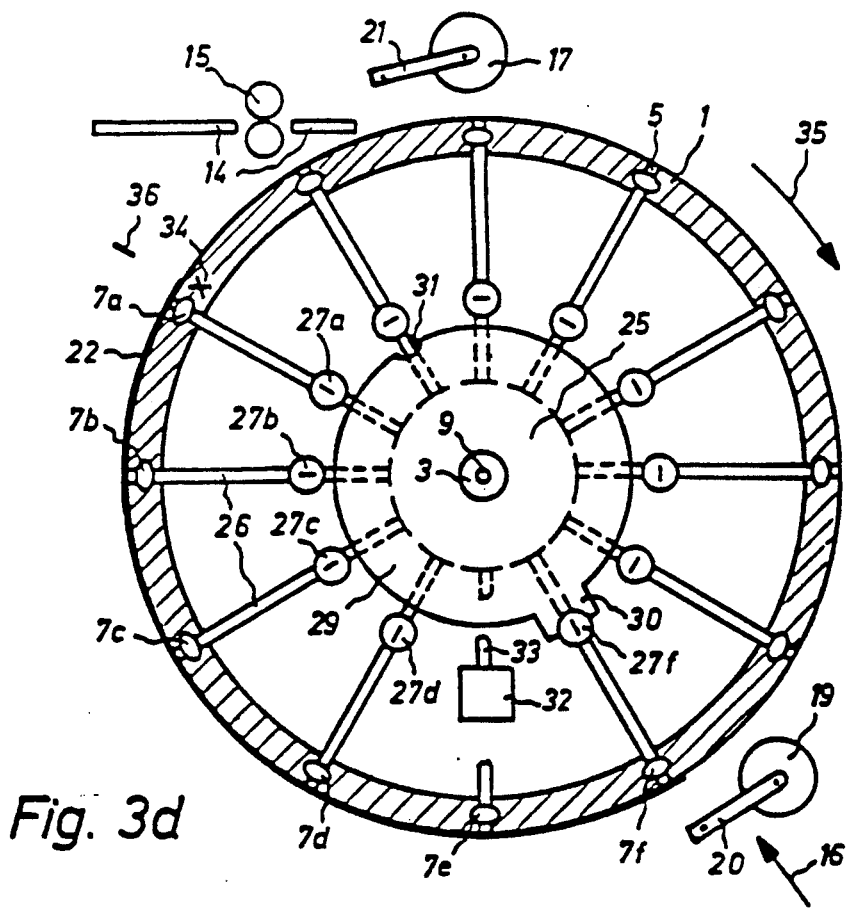

FIG. 3d shows the recording drum 1 at that time at which it has already turned into the start-of-exposure position on the basis of the positioning drive 16 and the positioning drive 16 is shut off. In the start-of-exposure position, the starting mark 34 on the recording drum is in coincidence with the optical axis 36 of a recording element (not shown).

It may be seen from the figure that no further suction channels 7 were connected in due to the rotation of the recording drum 1 into the start-of-exposure position since the control finger 30 of the plate cam 29 remains at the valve 27f.

After the clamping event as set forth above, the positioning drive 16 is pivoted away from the recording drum 1, the main motor 2 shown in FIG. 2 is started, the film proof 22 is exposed point-by-point and line-by-line and the exposed film proof 22 is in turn unclamped from the recording drum 1.

The unclamping of the film proof, which is not shown and described in greater detail, can, for example, ensue automatically in that a lift-off finger that can be pivoted against the drum surface which engages under the start of the film proof 22 and peels it from the drum surface under vacuum by turning the recording drum 1 in the direction of the arrow 35 with the positioning drive 16. The film proof that has been peeled off can then be conveyed into a slave film cassette or can be directly conveyed via a conveying channel into a development station.

Figure 3E:
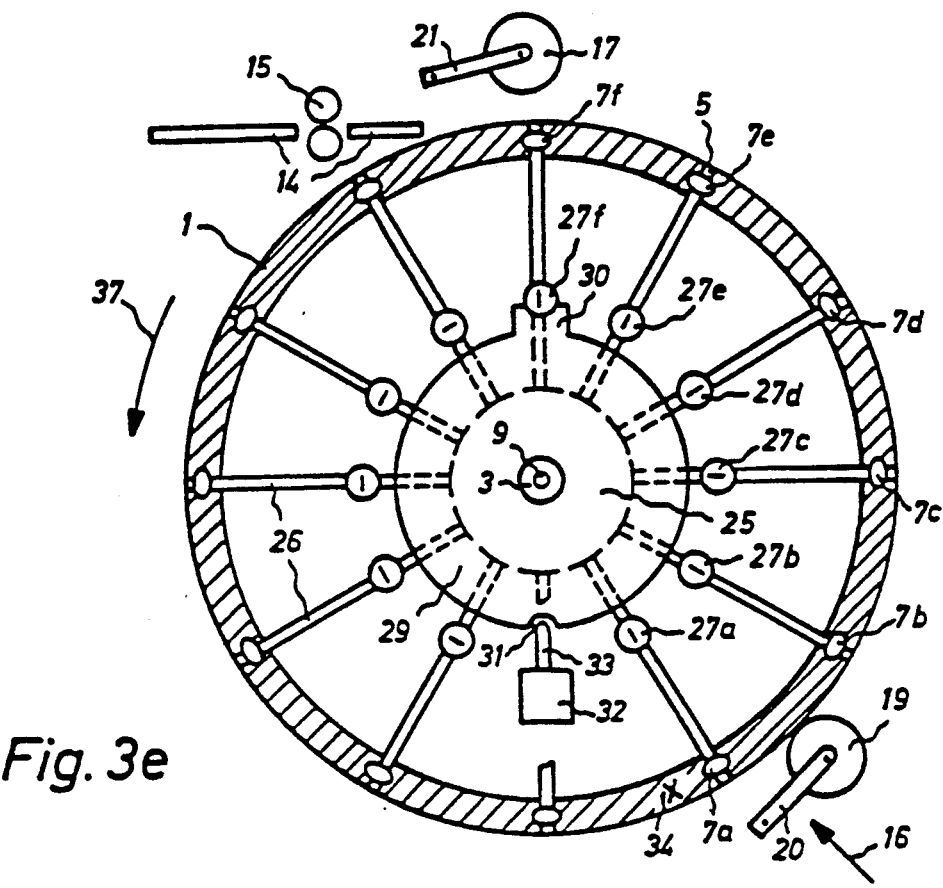

FIG. 3e shows the recording drum 1 after the unclamping of the exposed film proof 22.

The valves 27a through 27f previously opened during unclamping are still open at this time and must be closed in preparation for a new clamping event.

To that end, the positioning drive 16 is again pivoted against the recording drum 1 and is started. The recording drum 1 turns together with the plate cam 29 in the direction of an arrow 37 in a direction opposite that during the clamping event. On the basis of a switch signal to the control element 32, the lock pin 33 is moved in the direction of the plate cam 29. The lock pin 33 first slides on the edge of the rotating plate cam 29 until it drops into the channel 31 and blocks the plate cam 29.

Figure 3F:
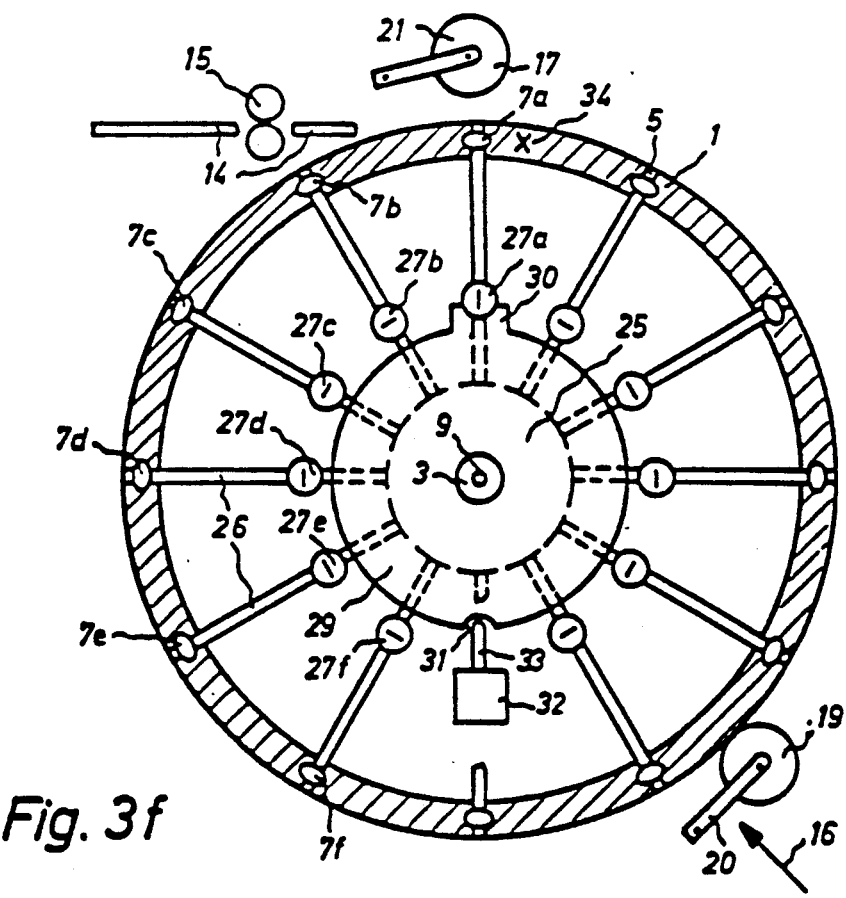

As a result of continued rotation of the recording drum 1 in the direction of the arrow 37, the valves 27f through 27a then successively move past the control finger 30 of the blocked plate cam 29 and are closed by the control finger 30. This condition is shown in FIG. 3f.

If the unclamping of the exposed film proofs is to ensue upon step-by-step vacuum disconnection of the individual suction hole rows, the recording drum 1 turns in the direction of the arrow 37, the control finger engages under the end of the exposed film proof and peels the latter from the recording drum.

FIG. 4 shows a practical exemplary embodiment of the clamping device with vacuum distributor in a longitudinal section through the recording drum 1 fashioned as a hollow cylinder.

Two of the suction channels 7 that are connected to the suction holes 5 may be seen in the wall 8 of the hollow cylinder 40. The end face of the hollow cylinder 40 is closed by the cover 2 that comprises a central opening 41. The inside of the cover 2 is provided with radially proceeding channels 42 that are in communication with the suction channels 7. The outside of the cover 2 comprises bores 43 that are circularly arranged around the drum axis and discharge into the radially proceeding channels 42. The bores 43 accept the valve bodies 44 of the valves 27. A plunger 45 that carries a circular seal surface 46 at one end and a control roller 47 at its other end is movable in the valve body 44 of a valve.

A cylindrical housing part 48 whose projection 49 is fitted into the opening 41 of the cover 2 is situated in the hollow cylinder 40. The circumferential surface 50 of the housing part 48 is connected air-tight to the inside surface of the hollow cylinder 40 and the end face 51 of the housing part 41 is connected air-tight to the inside surface of the cover 2. The channels 42 in the cover 2 covered air-tight by the end face 51 of the housing part 48 form the distributor lines 26. The shaft extension 3 is secured to the projection 49 of the housing part 48. The interior of the housing part 48 forms the vacuum chamber 25 that is connected to the suction bore 9 in the shaft extension 3 via a suction bore 9 in the housing part 48. At its end face 51, the housing part 48 comprises bores 52 circularly arranged around the drum axis, these lying opposite the valves 27 and being closable by the seal surfaces 46 of the valves 27.

The plate cam 29 is seated in a glide mount on the projection 53 of the shaft extension 3 on the basis of a disc 54. The channel 31 into which the lock pin 33 can be introduced may be seen at the plate cam 29.

In FIG. 4, the upper valve 27 is opened by the control finger 30 of the plate cam 29 in that the seal surface 46 releases the corresponding bore 52, as a result whereof a connection between the vacuum chamber 25 and the upper suction channel 7 is produced via the bore 52 and via the distributor line 26. The lower valve 27, by contrast, is closed in that the seal face 46 of the valve 27 is pressed against the appertaining bore 52 by a spring 55, as a result whereof the connection between vacuum chamber 25 and lower suction channel 7 is interrupted. As a result of the spring 55, the valve 27 has a stable work position in the closed condition. The control of the valves 27 by the plate cam 29 shall be set forth in greater detail with reference to FIG. 5.

The housing part 48 can additionally comprise a choke 56 that connects the vacuum chamber 25 to the interior of the drum. When evacuating the vacuum chamber 25, a vacuum is also gradually built up in the interior of the drum through the choke bore 56, this vacuum serving as vacuum store. This vacuum store effects that the vacuum at the suction holes 5 is only slowly dismantled when the vacuum pump is switched off.

FIG. 5 illustrates the control of the valves by the plate cam 29. The control finger 30 of the plate cam 29 that has hitherto been only schematically indicated is designed as a "shunt" for the control roller 47 of the valve 27.

In FIG. 5a, the control roller 47 of the valve 27 has not yet reached the control finger 30 of the plate cam 29. The valve 27 remains in the stable, "closed" work position wherein the seal surface 46 seals the bore 52.

In FIG. 5b, the control roller 47 of the valve 27 has been seized by the control finger 30 of the plate cam 29 due to a movement of the valve 27 in the direction of an arrow 57 and is guided onto the plate cam 29, as a result whereof the plunger 45 of the valve 27 executes a lifting motion. As a result of this lifting motion of the plunger 44, the valve 27 now assumes the "open" working position wherein the seal surface 46 releases the bore 52.

In that the control roller 46 now rolls on the plate cam 29, the valve 27 is fixed in the "open" working position. As a result of a relative motion in the opposite direction, the control roller 47 of the valve 27 can be conducted into the stable, "closed" working position via the control finger 30.

Figure 6:
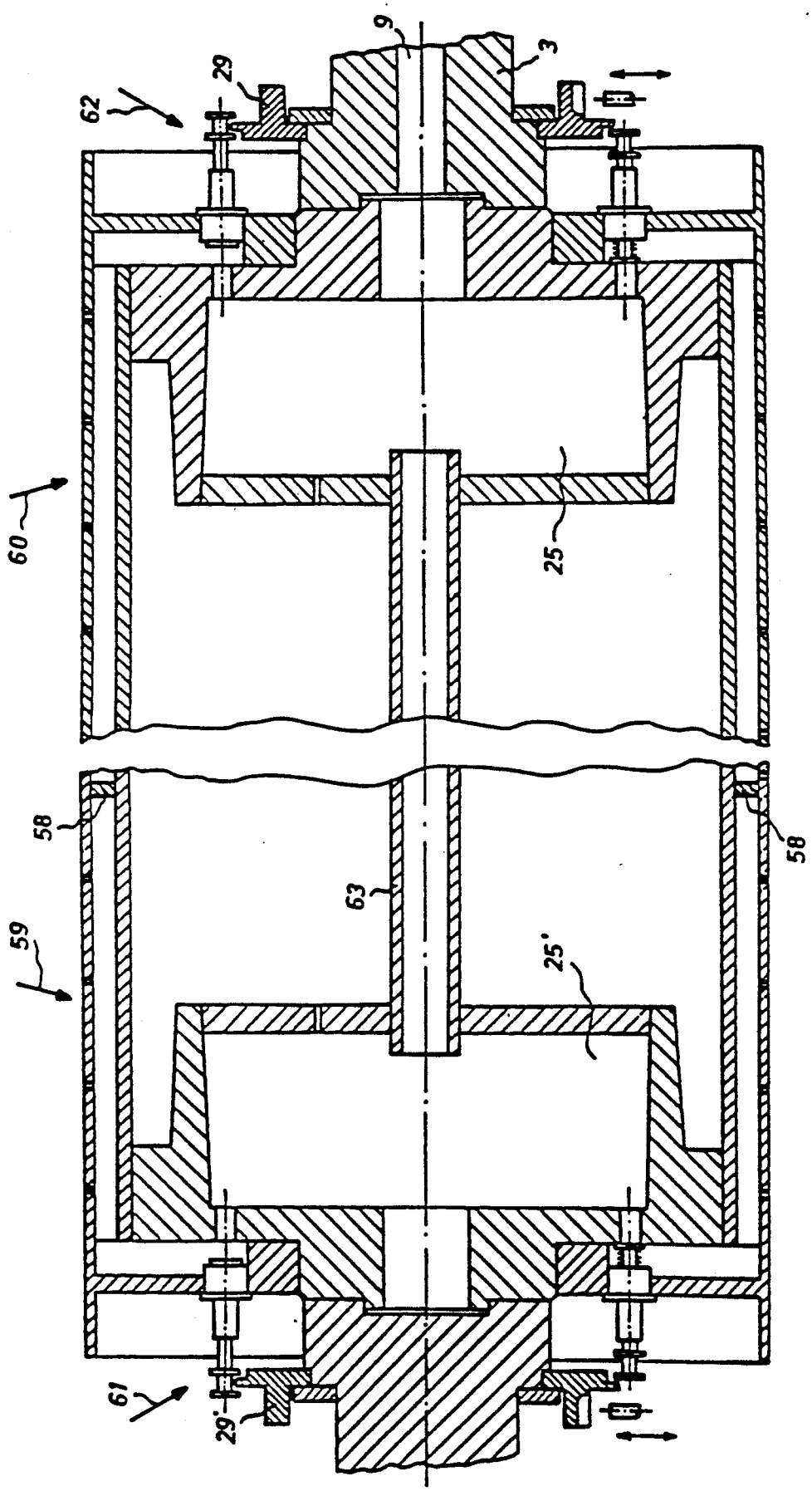
FIG. 6 is a further exemplary embodiment of a clamping device.

FIG. 6 shows another exemplary embodiment of the clamping device wherein the recording drum 1 is subdivided into two vacuum regions 59 and 60 lying side-by-side by bulkheads in the suction channel 7, these vacuum regions 59 and 60 being capable of being separately charged with vacuum. Both vacuum regions 59 and 60 are controllable by separate vacuum distributors 61 and 62. As shown and described in FIG. 5, the vacuum chamber 25 of the vacuum distributor 62 is connected to the vacuum pump 13 via the suction bore 9 in the shaft extension 3. By contrast thereto, the vacuum chamber 25' of the vacuum distributor 61 is supplied with vacuum from the vacuum chamber 25 of the vacuum distributor 62 via a pipeline 63.

The two vacuum regions 59 and 60 can be separately controlled by the plate cams 29 and 29', as a result whereof the vacuum losses can be advantageously kept low even given different format widths of the film proofs to be clamped on.

When a film proof having a smaller format width than the width of a vacuum region is to be clamped on, only one of the vacuum regions is activated. The other vacuum region then remains disconnected in that the plate cam of the corresponding vacuum region is not blocked during the clamping event, no valves being opened as a result thereof.

When two film proofs having small format width but identical format length, or one film proof whose format width is larger than the width of a vacuum region is to be clamped on, both vacuum regions are activated and the automatic cut-in of the suction hole rows is synchronously controlled.

When two film proofs having small format width but different format lengths are to be clamped on, the cut-in of the suction hole rows can be advantageously separately controlled in the two vacuum regions in accordance with the respective format length.

Although various minor changes and modifications might be proposed by those skilled in the art, it will be understood that we wish to include within the claims of the patent warranted hereon all such changes and modifications as reasonably come within our contribution to the art.

We claim:

1. A device for clamping sheet-shaped recording material onto a recording drum of a reproduction device, comprising:
    suction holes in a generated surface of the recording drum, said suction holes being arranged in suction hole rows which proceed substantially axially with respect to an axis of the recording drum;
    separate suction channels isolated from each other in the recording drum proceeding substantially axially with respect to the drum axis, each suction channel being arranged to connect the suction holes of a respective suction hole row to one another;
    a vacuum chamber in the recording drum which is in communication with a stationary vacuum pump;

individual respective distributor lines between the vacuum chamber and the individual suction channels;

controllable valve means in the distributor lines for selective connection and separation of the individual channels to and from the vacuum chamber; and control means arranged in a region of the recording drum for control based on sensing rotational movement and position of the recording drum for automatic, successive opening and/or closing of the controllable valve means during clamping and/or unclamping the recording material, the controllable valve means being automatically controlled by the control means such that during clamping of the recording material, first a suction hole row lying in a starting region of the recording material is charged with vacuum, and thereafter with increasing wrap of the recording material around the recording drum, further suction hole rows are then successively connected to the vacuum chamber and charged with vacuum, and wherein cut-in of further suction hole rows is interrupted in accordance with a respective circumferential length of the recording material at a region of a suction hole row lying in an end region of said recording material.

2. A device according to claim 1 wherein said controllable valve means have two stable working positions.

3. A device according to claim 1 wherein said vacuum chamber has a choke bore.

4. A device according to claim 1 wherein a secondary air valve means which can be turned on and off is connected between said vacuum chamber and said vacuum pump for reducing vacuum during clamping of the recording material.

5. A device according to claim 1 wherein spacings of said suction hole rows on said recording drum are chosen in accordance with circumferential lengths of standard formats for recording material to be clamped on.

6. A device according to claim 1 wherein said recording drum has a clamping mark means for identifying said suction hole row at which said starting region of said recording material to be clamped on is respectively fixed.

7. A device according to claim 1 wherein:

a conveyor surface for said recording material proceeds substantially tangentially with respect to said recording drum in a region of said recording drum;

conveyor means for conveying said recording material to said recording drum;

a pressure roller means for being pivoted against said recording drum in a region where said start of said recording material conveyed to the recording drum via said conveying surface comes into contact with said drum surface;

a positioning drive means for being pivotable against said recording drum during clamping of said sheet-shaped recording material for turning said recording drum; and a motor means coupled to said recording drum for turning said recording drum during point-by-point and line-by-line exposure of said recording material.

8. A device according to claim 7 wherein said conveyor means comprise conveyor rollers arranged under and above said conveying surface, at least one of said conveyor rollers being drivable.

9. A device according to claim 1 wherein:

said suction channels in said recording drum comprise partition means for subdividing said recording drum into two separate vacuum regions; and each vacuum region having a separately controllable vacuum distributor allocated to it.

10. A device according to claim 9 wherein each vacuum region has an associated vacuum chamber and wherein the vacuum chamber associated with one of said vacuum distributors is connected to the vacuum chamber associated with the other vacuum distributor via a pipe proceeding axially in an interior of said drum.

11. A device for clamping sheet-shaped recording material onto a recording drum of a reproduction device, comprising:

suction holes in a generated surface of the recording drum, said suction holes being arranged in suction hole rows which proceed substantially axially with respect to an axis of the recording drum;

suction channels in the recording drum proceeding substantially axially with respect to the drum axis, each suction channel being arranged to connect the suction holes of a suction hole row to one another;

a vacuum chamber in the recording drum which is in communication with a stationary vacuum pump;

distributor lines between the vacuum chamber and the individual suction channels;

controllable valve means in the distributor lines for selective connection and separation of the individual channels to and from the vacuum chamber;

control means arranged in a region of the recording drum for control by rotational movement of the recording drum for automatic, successive opening and/or closing of the controllable valve means during clamping and/or unclamping of the recording material, the controllable valve means being automatically controlled by the control means such that during clamping of the recording material, first a suction hole row lying in a starting region of the recording material is charged with vacuum, and thereafter with increasing wrap of the recording material around the recording drum, further suction hole rows are then successively connected to the vacuum chamber and charged with vacuum, and wherein cut-in of further suction hole rows is interrupted in accordance with a respective circumferential length of the recording material at a region of a suction hole row lying in an end region of said recording material;

a plate cam seated on a shaft extension of the recording drum and having a control finger means as an actuation element for opening and closing the valve means, said valve means being circularly arranged around the plate cam; and a lock means for blocking the plate cam in a prescribed, stationary position with respect to the recording drum, said plate cam being seated on the extension shaft by a slide fit means such that when the pate cam is not blocked by the lock means, it is entrained without slippage by the shaft extension of the rotating recording drum.

12. A device according to claim 11 wherein the lock means comprises a lock pin adjustable by a stationary control element, and said lock pin being positioned to engage into a channel situated in the plate cam.

13. A device for clamping sheet-shaped recording material onto a recording drum of a reproduction device, comprising:

suction holes in a generated surface of the recording drum, said suction holes being arranged in suction hole rows which proceed substantially axially with respect to an axis of the recording drum;

suction channels in the recording drum proceeding substantially axially with respect to the drum axis, each suction channel being arranged to connect the suction holes of a suction hole row to one another;

a vacuum chamber in the recording drum which is in communication with a stationary vacuum pump;

distributor lines between the vacuum chamber and the individual suction channels;

controllable valve means in the distributor lines for selective connection and separation of the individual channels to and from the vacuum chamber;

control means arranged in a region of the recording drum for control by rotational movement of the recording drum for automatic, successive opening and/or closing of the controllable valve means during clamping and/or unclamping of the recording material, the controllable valve means being automatically controlled by the control means such that during clamping of the recording material, first a suction hole row lying in a starting region of the recording material is charged with vacuum, and thereafter with increasing wrap of the recording material around the recording drum, further suction hole rows are then successively connected to the vacuum chamber and charged with vacuum, and wherein cut-in of further suction hole rows is interrupted in accordance with a respective circumferential length of the recording material at a region of a suction hole row lying in an end region of said recording material; and said controllable valve means being controllable into an "open" working position by respective actuation of a control roller secured to a plunger by a control finger on a plate cam, said valve means assuming their stable, "closed" working position without actuation of said control roller by said control finger.

14. A device for clamping sheet-shaped recording material onto a recording drum of a reproduction device, comprising:

suction holes in a generated surface of the recording drum, said suction holes being arranged in suction hole rows which proceed substantially axially with respect to an axis of the recording drum;

suction channels in the recording drum proceeding substantially axially with respect to the rum axis, each suction channel being arranged to connect the suction holes of a suction hole row to one another;

a vacuum chamber in the recording drum which is in communication with a stationary vacuum pump;

distributor lines between the vacuum chamber and the individual suction channels;

controllable valve means in the distributor lines for selective connection and separation of the individual suction channels to and from the vacuum chamber;

control means arranged in a region of the recording drum for control by rotational movement of the recording drum for automatic successive opening and/or closing of the controllable valve means during clamping and/or unclamping of the recording material, the controllable valve means being automatically controlled by the control means such that during clamping of the recording material, first a suction hole row lying in a starting region of the recording material is charged with vacuum, and thereafter with increasing wrap of the recording material around the recording drum, further suction hole rows are then successively connected to the vacuum chamber and charged with vacuum, and wherein cut-in of further suction hole rows in interrupted in accordance with a respective circumferential length of the recording material at a region of a suction hole row lying in an end region of said recording material;

said recording drum comprising a hollow cylinder in a wall of which said suction channels proceed, and wherein end faces of the recording drum are closed by disc-shaped covers, at least one of which has a central opening;

an inside surface of at least one of the covers directed toward an interior of the drum comprising substantially radially proceeding channels;

an outside surface of at least one of the covers being provided with bores circularly arranged around the drum axis, said bores discharging into said suction channels, and said control valve means being attached to extend into said radially proceeding channels;

a cylindrical housing part being provided at said inside surface of said at least one cover and having its projection secured in said central opening of said at least one cover, said radially proceeding channels in said at least one cover being covered air-tight by said cylindrical housing part to form said distributor lines connected to said suction channels;

a shaft extension on said drum axis having a suction bore secured to said projection of said housing part and projecting through said central opening of said at least one cover;

an interior of said housing part forming said vacuum chamber which is in communication with said suction bore in said shaft extension via a bore in said housing part;

a portion of said housing part directed toward said at least one cover having circularly arranged bores that connect said vacuum chamber to said radially proceeding channels and which are arranged such that said bores are closed in one position of said controllable valve means; and said control means comprising a plate cam being seated at a projection of said shaft extension, said plate cam being positioned to selectively actuate said controllable valve means.

15. A device for clamping sheet-shaped material onto a drum of a device, comprising:

suction holes in a surface of the drum, said suction holes being arranged in suction hole rows which proceed substantially axially with respect to an axis of the drum;

separate suction channels isolated from each other arranged to connect the suction holes of a respective suction hole row to one another;

a vacuum chamber in the recording drum which is in communication with a vacuum pump;

individual respective distributor lines between the vacuum chamber and the suction channels;

controllable valve means for selective connection and separation of the individual channels to and from the vacuum chamber; and control means for control derived from rotational movement of the drum for automatic, successive opening and/or closing of the controllable valve means during clamping and/or unclamping of the material, the controllable valve means being controlled by the control means such that during clamping of the recording material, first a suction hole row lying at a starting region of the recording material is charged with vacuum, and thereafter with increasing wrap of the material around the drum, further suction hole rows are then successively connected to the vacuum chamber and charged with vacuum, and cut-in of further suction hole rows is interrupted in accordance with a respective circumferential length of the material.

16. A method for clamping sheet-shaped recording material onto a recording drum of a reproduction device for point-by-point and line-by-line exposure of said recording material by the recording element, comprising steps of:

providing a generated surface of said recording drum with suction hole rows proceeding substantially axially and with each suction hole row having a respective suction channel, and connecting said suction hole rows via said respective channels to a vacuum pump in order to fix the recording material on the recording drum by vacuum suctioning;

for said fixing of said recording material, turning said recording drum into a start-of-clamping position with a positioning drive pivoted against a surface of the drum, and positioning a clamping mark on the recording drum approximately under a pressure roller at said start-of-clamping position, the clamping mark marking a suction hole row at which a starting region of said recording material to be clamped on should lie; starting a conveyor means and conveying the recording material over a conveying surface to said recording drum until said starting region of the recording material lies at said first suction hole row marked by said clamping mark;

lowering said pressure roller onto the recording drum;

by sensing a rotational position of said recording drum, switching on said vacuum pump and charging said first suction hole row via its corresponding channel with vacuum by use of a vacuum distributor and by opening a corresponding valve so as to suck on said starting region of the recording material;

again starting the positioning drive and opening further valves by sensing rotational position of said recording drum such that further suction hole rows are connected via their respective channels little-by-little and charged with vacuum in correspondence with an increasing wrap of the recording material onto the turning recording drum;

ending connection of further suction hole rows at a region of a suction hole row lying at an end region of the recording material based on a respective circumferential length of the recording material;

stopping the positioning drive and pivoting it away from the recording drum when said clamping mark is situated at a start-of-exposure position which lies in an optical axis of said recording element, and lifting off said pressure roller and starting a motor for point-by-point and line-by-line exposure of said recording material;

after the exposure, switching off the motor, again pivoting the positioning drive against the recording drum and starting it;

unclamping the exposed recording material from the recording drum and shutting off the vacuum pump;

shutting off suction hole rows added in during clamping by closing corresponding valves; and turning the recording drum into the start-of-clamping position by said positioning drive.

17. A method according to claim 16 including the step of lowering a nominal value of vacuum provided during exposure for a duration of the clamping by opening a secondary air valve, as a result whereof said recording material is suctioned on with reduced underpressure.

18. A method for clamping sheet-shaped recording material onto a recording drum of a reproduction device for point-by-point and line-by-line exposure of said recording material by the recording element, comprising steps of:

providing a generated surface of said recording drum with suction hole rows proceeding substantially axially, and connecting said suction hole rows to a vacuum pump in order to fix the recording material on the recording drum by vacuum suctioning;

for said fixing of said recording material, turning said recording drum into a start-of-clamping position with a positioning drive pivoted against a surface of the drum, and positioning a clamping mark on the recording drum approximately under a pressure roller at said start-of-clamping position, the clamping mark marking a suction hole row at which a starting region of said recording material to be clamped on should lie;

starting a conveyor means and conveying the recording material over a conveying surface of said recording drum until said starting region of the recording material lies at said first suction hole row marked by said clamping mark;

lowering said pressure roller onto the recording drum;

by sensing a rotational position of said recording drum, switching on said vacuum pump and charging said first suction hole row via its corresponding channel with vacuum by use of a vacuum distributor and by opening a corresponding valve so as to suck on said starting region of the recording material;

again starting the positioning drive and opening further valves by sensing rotational position of said recording drum such that further suction hole rows are connected via their respective channels little-by-little and charged with vacuum in correspondence with an increasing wrap of the recording material onto the turning recording drum;

ending connection of further suction hole rows at a region of a suction hole row lying at an end region of the recording material based on a respective circumferential length of the recording material;

stopping the positioning drive and pivoting it away from the recording drum when said clamping mark is situated at a start-of-exposure position which lies in an optical axis of said recording element, and lifting off said pressure roller and starting a motor for point-by-point and line-by-line exposure of said recording material;

after the exposure, switching off the motor, again pivoting the positioning drive against the recording drum and starting it;

unclamping the exposed recording material from the recording drum and shutting off the vacuum pump;

shutting off suction hole rows added in during clamping by closing corresponding valves;

turning the recording drum into the start-of-clamping position by said positioning drive; and in said start-of-clamping position of the recording drum blocking a plate cam coupled with the recording drum in said start-of-clamping position by a lock mechanism, said plate cam opening the valve corresponding to said first suction hole row marked by said clamping mark.

19. A method according to claim 18 including the steps of blocking the plate cam when clamping the recording material so that as a result thereof corresponding valves allocated to individual suction hole rows move past a control finger of the plate cam and are opened as a result of the rotating recording drum.

20. A method according to claim 19 including the steps of cancelling said blocking of the plate cam when said control finger of the plate cam has opened a valve corresponding to said suction hole row at which said end region of the recording material is situated.

21. A method according to claim 20 including the further steps of again blocking the plate cam for closing corresponding valves which had been opened for corresponding suction rows by moving the valves past said control finger of the blocked plate cam by turning the recording drum in a direction opposite a direction it turns for the clamping.

22. A method for clamping sheet-shaped material onto a rotating drum, comprising steps of:

providing a surface of said drum with suction hole rows and corresponding channels proceeding substantially axially, and connecting said suction hole rows to a vacuum pump in order to fix the material on the drum by vacuum suctioning;

conveying the material to said drum until a starting region of the recording material lies at a first suction hole row;

charging said first suction hole row with vacuum via a channel by opening a corresponding valve based on sensing rotational position of the drum so as to suck onto the drum said starting region of the recording material;

rotating the drum and opening further valves based on sensing rotational position of the drum such that further suction hole rows via the individual channels are sequentially connected and charged with vacuum in correspondence with an increasing wrap of the recording material onto the turning recording drum; and ending connection of further suction hole rows based on a respective circumferential length of the recording material.

* * * * *